(12) United States Patent
Itoh

(10) Patent No.: US 12,019,388 B2
(45) Date of Patent: Jun. 25, 2024

(54) MOTOR CONTROL APPARATUS CONFIGURED TO CONTROL COMMAND VALUE OF EXCITATION CURRENT BASED ON ROTATION SPEED OF ROTOR, AND IMAGE FORMING APPARATUS

(71) Applicant: CANON KABUSHIKI KAISHA, Tokyo (JP)

(72) Inventor: Masatoshi Itoh, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 17/847,638

(22) Filed: Jun. 23, 2022

(65) Prior Publication Data
US 2023/0015968 A1 Jan. 19, 2023

(30) Foreign Application Priority Data

Jul. 15, 2021 (JP) .................................. 2021-117319

(51) Int. Cl.
| | |
|---|---|
| *H02P 21/20* | (2016.01) |
| *G03G 15/00* | (2006.01) |
| *H02P 6/182* | (2016.01) |
| *H02P 21/18* | (2016.01) |

(52) U.S. Cl.
CPC ......... *G03G 15/5008* (2013.01); *G03G 15/80* (2013.01); *H02P 6/182* (2013.01); *H02P 21/18* (2016.02); *H02P 21/20* (2016.02)

(58) Field of Classification Search
CPC .......... H02P 6/182; H02P 21/18; H02P 21/20; H02P 21/24; H02P 21/34
See application file for complete search history.

(56) References Cited

U.S. PATENT DOCUMENTS

| | | | |
|---|---|---|---|
| 9,369,073 B1* | 6/2016 | Tian | ........................ H02P 6/181 |
| 9,431,940 B2 | 8/2016 | Kameyama | |
| 10,320,317 B2 | 6/2019 | Yamasaki et al. | |
| 2009/0261774 A1* | 10/2009 | Yuuki | ..................... H02P 21/10 |
| | | | 310/156.01 |
| 2015/0145454 A1 | 5/2015 | Kameyama | |
| 2019/0341866 A1* | 11/2019 | Fujimori | ............ G03G 15/6558 |
| 2020/0220486 A1* | 7/2020 | Chen | ........................ H02P 21/18 |
| 2022/0286070 A1* | 9/2022 | Furutani | ................. H02P 23/14 |

FOREIGN PATENT DOCUMENTS

| | | |
|---|---|---|
| JP | H08223970 A | 8/1996 |
| JP | 2011066992 A | 3/2011 |
| JP | 2015104263 A | 6/2015 |
| JP | 2018046595 A | 3/2018 |
| JP | 2020150666 A | 9/2020 |

\* cited by examiner

*Primary Examiner* — Bickey Dhakal
(74) *Attorney, Agent, or Firm* — ROSSI, KIMMS & McDOWELL LLP (57) ABSTRACT

A motor control apparatus includes: a current supply unit configured to supply a coil current to a plurality of coils of a motor by controlling a voltage to be applied to the plurality of coils, based on a first command value of an excitation current and a second command value of a torque current; and a control unit configured to control the first command value based on a rotation speed of a rotor of the motor, wherein the control unit is further configured to control, when the rotation speed of the rotor is lower than a first threshold value, the first command value to cause the excitation current to be larger than zero, and control the second command value to supply the torque current in accordance with a load of the rotor.

8 Claims, 10 Drawing Sheets

MOTOR CONTROL APPARATUS CONFIGURED TO CONTROL COMMAND VALUE OF EXCITATION CURRENT BASED ON ROTATION SPEED OF ROTOR, AND IMAGE FORMING APPARATUS

BACKGROUND OF THE INVENTION

Field of the Invention

The present invention relates to a control technique of a motor.

Description of the Related Art

As a drive source of an image forming apparatus, a sensorless type motor not equipped with a sensor that detects a rotor position is used. A motor control apparatus that controls a sensorless type motor first detects a stop position of a rotor by a predetermined method in activation of the motor. US-2015-145454 discloses a configuration where a stop position of a rotor (rotation phase of the rotor that is stopped) is detected by using a property in which an inductance value of a coil of a motor changes in accordance with the stop position of the rotor. The motor control apparatus starts driving of the motor by forced commutation control, based on the detected stop position of the rotor. When the rotation speed of the rotor reaches or exceeds a predetermined speed, the motor control apparatus can detect the rotation position (rotation phase) and the rotation speed of the rotor from an induced voltage generated in the coil, as described in Japanese Patent Laid-Open No. 08-223970. Accordingly, after the rotation speed of the rotor has reached or exceeded the predetermined speed, the motor control apparatus switches to sensorless control that controls the rotation of the rotor by detecting the rotation position (rotation phase) and the rotation speed of the rotor from an induced voltage generated in the coil.

When the rotation speed of the rotor is low, the induced voltage generated in the coil may become smaller. When the induced voltage generated in the coil is small, the detection accuracy of the rotation position and the rotation speed of the rotor may degrade. In addition, when a load of the motor is small, a coil current flowing through the coil may become small. The detection accuracy of the rotation position and the rotation speed of the rotor may also degrade when the coil current is small. Degradation of the detection accuracy of the rotation position and the rotation speed of the rotor may increase uneven rotation of the rotor, whereby rotation of the rotor may become unstable.

SUMMARY OF THE INVENTION

According to an aspect of the present disclosure, a motor control apparatus includes: a current supply unit configured to supply a coil current to a plurality of coils of a motor by controlling a voltage to be applied to the plurality of coils, based on a first command value of an excitation current and a second command value of a torque current; and a control unit configured to control the first command value based on a rotation speed of a rotor of the motor, wherein the control unit is further configured to control, when the rotation speed of the rotor is lower than a first threshold value and a load of the rotor is a first load, the first command value to cause the excitation current to be larger than zero, and control the second command value to supply the torque current in accordance with the first load; and control, when the rotation speed of the rotor is lower than the first threshold value and the load of the rotor is a second load larger than the first load, the first command value to cause the excitation current to be larger than zero, and control the second command value to supply the torque current in accordance with the second load.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
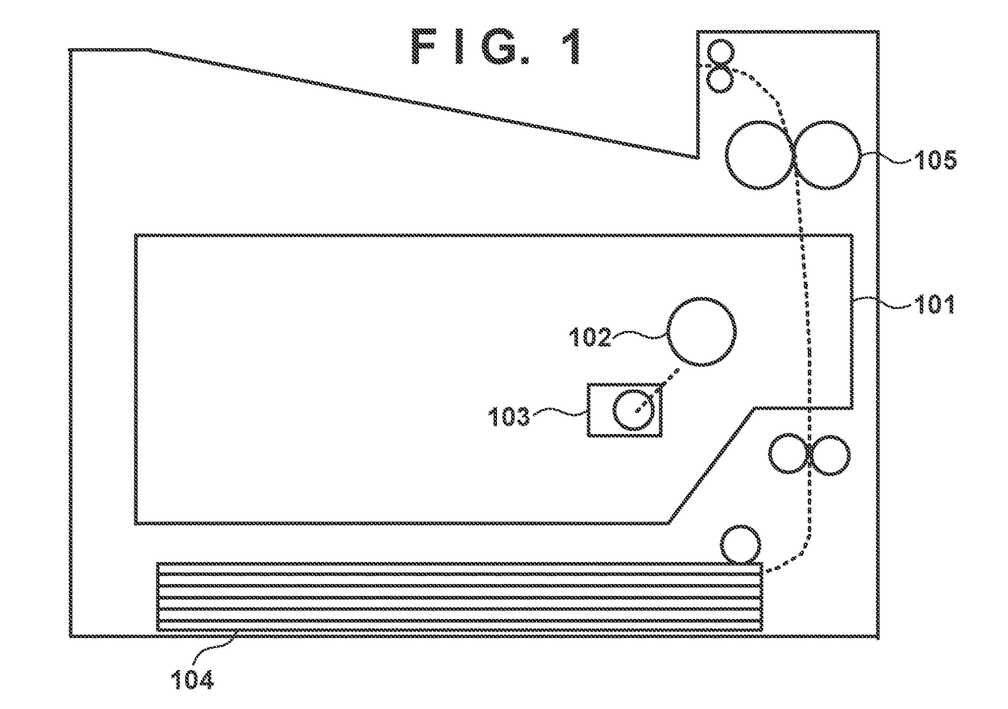
FIG. 1 is a configuration diagram of an image forming apparatus according to an embodiment.

The present embodiments will be explained below with reference to an image forming apparatus as an example of a motor control apparatus. Note that the present invention is not limited to an image forming apparatus and may be applied to any motor control apparatus that performs vector control. FIG. 1 is a configuration diagram of an image forming apparatus according to the present embodiment. The image forming apparatus may be, for instance, a printer, a copier, a multifunction machine, a facsimile, or the like. An image forming unit 101 forms a toner image on a photoreceptor 102. The image forming unit 101 includes a charging unit, an exposure unit, a development unit and the like for forming a toner image on the photoreceptor 102. The image forming unit 101 transfers the toner image of the photoreceptor 102 to a sheet conveyed along a conveyance path from a cassette 104. Subsequently, the sheet is heated and pressurized in a fixing unit 105, and the toner image is fixed. After the fixing of the toner image, the sheet is discharged to the outside of the image forming apparatus. A sensorless motor (hereinafter, simply referred to as a motor) 103 is a drive source that generates driving force for driving the photoreceptor 102. However, there is no limitation on the load driven by the motor 103, and the present disclosure may be applied to control of the motor 103 that drives any load (member) in the image forming apparatus.

Figure 2:
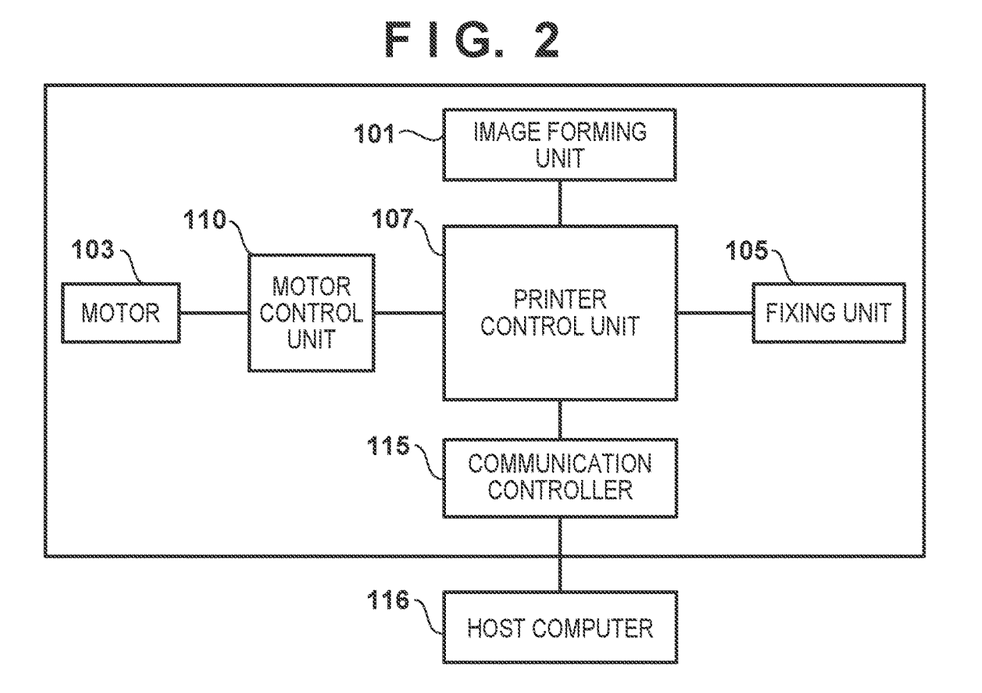
FIG. 2 is a control configuration diagram of an image forming apparatus according to an embodiment.

FIG. 2 illustrates a control configuration of the image forming apparatus. A printer control unit 107 entirely controls the image forming apparatus including the image forming unit 101 and the fixing unit 105 described above. The printer control unit 107 includes a processor (not illustrated), and a memory (not illustrated) that stores a program and various kinds of control data. The processor of the printer control unit 107 executes a program stored in the memory of the printer control unit 107, and thus performs various kinds of process for controlling the image forming apparatus. Note that in so doing, the printer control unit 107 uses the control data stored in the memory. A communication controller 115 communicates with a host computer 116 and receives image data of an image to be formed by the image forming apparatus from the host computer 116. A motor control unit 110 controls the motor 103 under control of the printer control unit 107.

Figure 3:
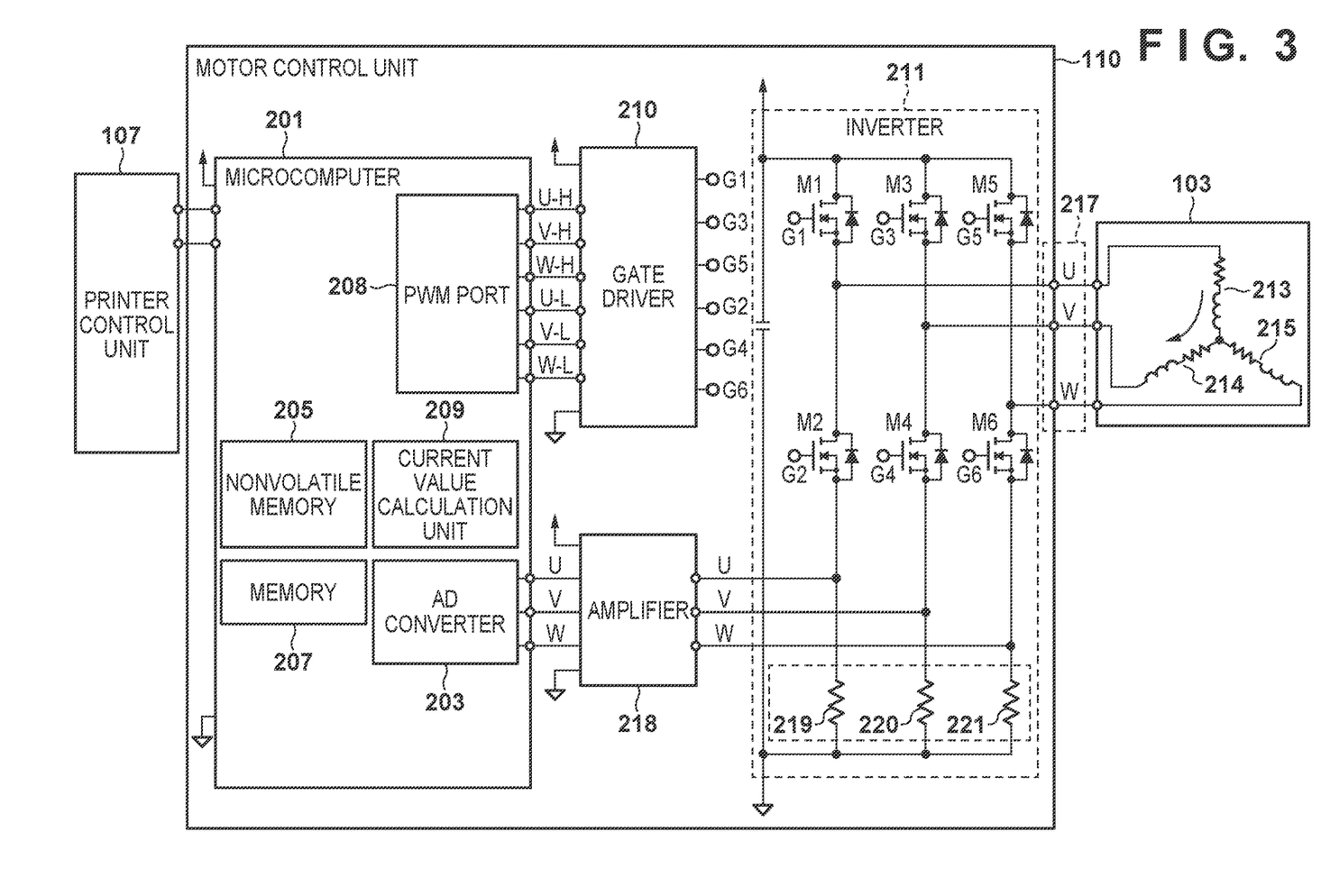
FIG. 3 is a configuration diagram of a motor control unit according to an embodiment.

FIG. 3 illustrates a control configuration of the motor 103. The motor control unit 110 communicates with the printer control unit 107 and controls the motor 103 under control of the printer control unit 107. A nonvolatile memory 205 of a microcomputer 201 stores a program executed by the microcomputer 201 and various kinds of data used for control of the motor 103. A memory 207 is used by the microcomputer 201 for temporary data storage. A PWM port 208 includes a total of six terminals for outputting two PWM signals (high side and low side) with respect to each of three phases (U, V, and W) of the motor 103. That is, the PWM port 208 includes three terminals of the high side (U-H, V-H, and W-H) and three terminals of the low side (U-L, V-L, and W-L).

An inverter 211 includes switching elements M1, M3, and M5 of the high side and switching elements M2, M4, and M6 of the low side, for each of the three phases of the motor 103. In FIG. 3, the switching elements M1 and M2 are U-phase switching elements, the switching elements M3 and M4 are V-phase switching elements, and the switching elements M5 and M6 are W-phase switching elements. As the switching element, for instance, a transistor or an FET can be used. Based on the PWM signal from the PWM port 208, a gate driver 210 controls ON/OFF of the corresponding switching element. For instance, the gate driver 210 controls ON/OFF of the switching element M1 by controlling applied voltage to a gate G1 of the switching element M1, based on the PWM signal output from the U-H terminal.

U-, V-, and W-phase outputs 217 of the inverter 211 are connected to coils 213 (U-phase), 214 (V-phase), and 215 (W-phase) of the motor 103. Coil current flowing through each of the coils 213, 214, and 215 can be controlled by controlling ON/OFF of each of the switching elements. In this manner, the inverter 211 functions as a current supply unit that supplies the coil current to each of the coils 213, 214, and 215. The coil current flowing through each of the coils 213, 214, and 215 is converted into voltage by current detection resistors 219, 220, and 221. An amplifier 218 amplifies the voltage of the current detection resistors 219, 220, and 221 corresponding to the coil current, and outputs the amplified voltage to an AD converter 203 of the microcomputer 201. The AD converter 203 converts the voltage output by the amplifier 218 into a digital value. A current value calculation unit 209 measures and detects the current value of the coil current in each phase, based on the digital value output by the AD converter 203.

Figure 4:
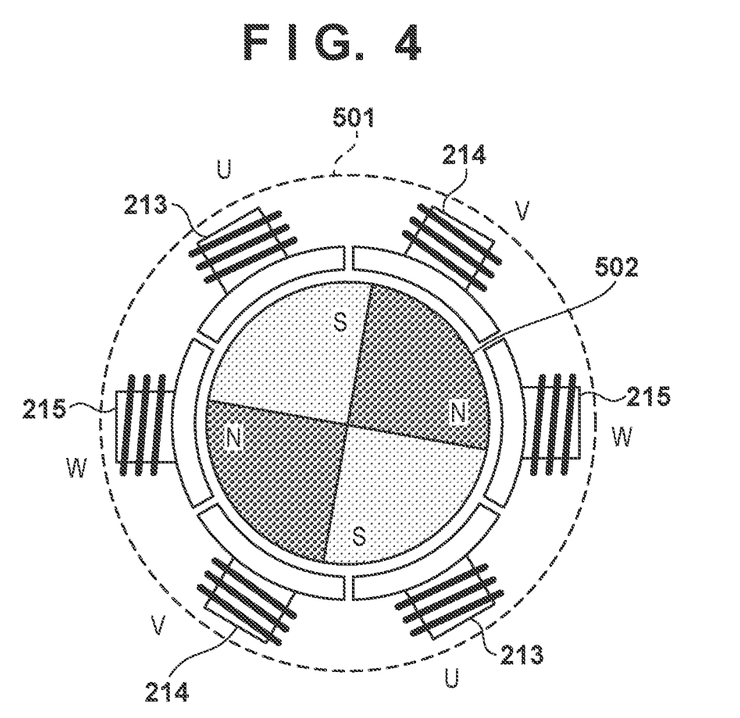
FIG. 4 is a configuration diagram of a motor according to an embodiment.

FIG. 4 is a configuration diagram of the motor 103. The motor 103 includes a stator 501 including six slots, and a rotor 502 including four poles. The stator 501 includes a U-phase coil 213, a V-phase coil 214, and a W-phase coil 215. The rotor 502 is constituted by a permanent magnet. A rotation phase of the rotor 502 is defined based on the case where the rotor 502 is in a predetermined state. As an example, a reference may be defined as a state in which the S-pole of the rotor 502 faces the U-phase coil 213 as illustrated in FIG. 4, that is, an electric angle of 0, and the electric angle increases in a counterclockwise manner. In the present embodiment, since the number of the poles of the rotor 502 is four, in a case where the rotor rotates counterclockwise by a mechanical angle of $\pi/2$ from the state of FIG. 4, an electric angle becomes $\pi$.

Figure 5:
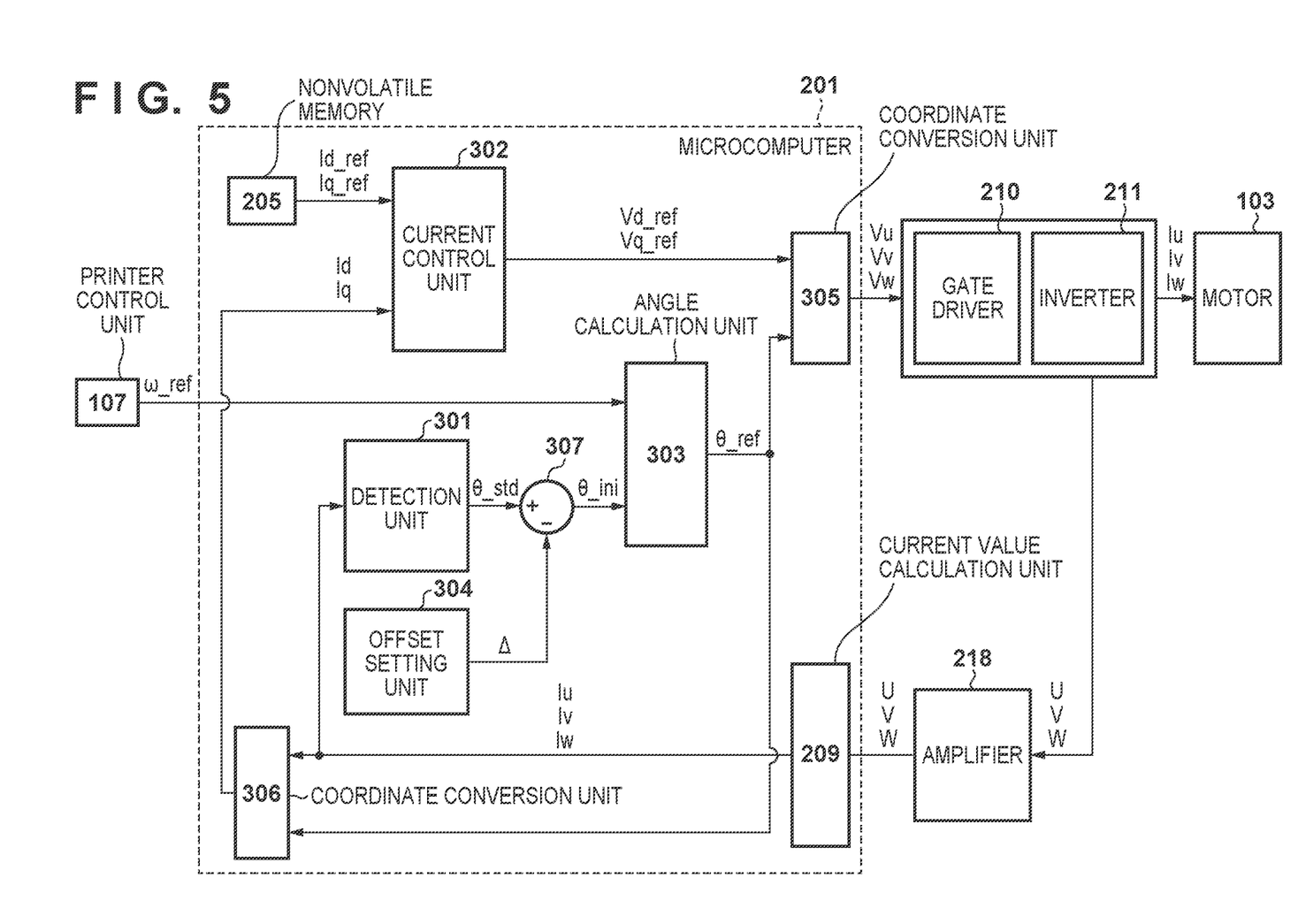
FIG. 5 is a functional block diagram of a microcomputer when performing forced commutation control according to an embodiment.

FIG. 5 is a functional block diagram of the microcomputer 201 in forced commutation control. Note that in the present embodiment, the microcomputer 201 vector-controls the motor 103. A current control unit 302 acquires a command value Id_ref of an excitation current and a command value Iq_ref of a torque current which have been preliminarily stored in the nonvolatile memory 205. Additionally, a measurement value Id of excitation current and a measurement value Iq of torque current are input from a coordinate conversion unit 306 to the current control unit 302. Note that the excitation current refers to a component in coil current that contributes to generation of a magnetic flux, and the torque current refers to a component in coil current that contributes to output torque. Based on these values, the current control unit 302 outputs voltage command values Vd_ref and Vq_ref in a rotating coordinate system. A coordinate conversion unit 305 generates and outputs voltage command values Vu, Vv and Vw of the U, V and W phases from the voltage command values Vd_ref and Vq_ref, by performing coordinate conversion from the rotating coordinate system into a static coordinate system, and further performing two-phase-to-three-phase conversion. Note that the coordinate conversion from the rotating coordinate system into the static coordinate system is performed based on an electric angle θ_ref output from an angle calculation unit 303. The microcomputer 201 generates the PWM signal to be output to the gate driver 210, based on the voltage command values Vu, Vv, and Vw.

Additionally, current values Iu, Iv, and Iw of U-phase, V-phase, and W-phase coil current detected based on the output of the amplifier 218 by the current value calculation unit 209 are input to the coordinate conversion unit 306. The coordinate conversion unit 306 converts the current values Iu, Iv, and Iw into current values in the static coordinate system by three-phase-to-two-phase conversion, and further performs coordinate conversion from the static coordinate system into the rotating coordinate system, and thus obtains the measurement value Id of excitation current and the measurement value Iq of torque current. Note that the coordinate conversion from the static coordinate system into the rotating coordinate system is performed based on the electric angle θ_ref output from the angle calculation unit 303. The coordinate conversion unit 306 outputs the measurement value Id of excitation current and the measurement value Iq of torque current to the current control unit 302.

At the time of activation of the motor 103, a detection unit 301 determines an initial phase of the rotor 502, that is, an electric angle at the time of stopping (hereinafter, stop angle) θ_std. For detection of the electric angle of the rotor 502 at the time of stopping, the configuration described in US-2015-145454 may be applied, for example. In this case, the detection unit 301 detects the stop angle θ_std by detecting inductance of each of the coils 213, 214, and 215, based on the current values Iu, Iv, and Iw. The detection unit 301 outputs the stop angle θ_std detected to a subtractor 307. An offset setting unit 304 outputs an offset amount A held by the nonvolatile memory 205 to the subtractor 307. The subtractor 307 outputs, to the angle calculation unit 303 as an initial angle θ_ini, an electric angle obtained by subtracting the offset amount A from the stop angle θ_std. Note that, to prevent step-out at the time of activation, the electric angle obtained by subtracting the offset amount A from the stop angle θ_std is set as the initial angle θ_ini.

The angle calculation unit 303 obtains the electric angle θ_ref (rotation phase) of the rotor 502, based on the initial angle θ_ini and a speed command value ω_ref input from the printer control unit 107, and notifies it to the coordinate conversion units 305 and 306. More specifically, the angle calculation unit 303 obtains the electric angle θ_ref of the rotor 502 by increasing an electric angle, based on the speed command value ω_ref with setting the initial angle θ_ini as an initial value.

Figure 6:
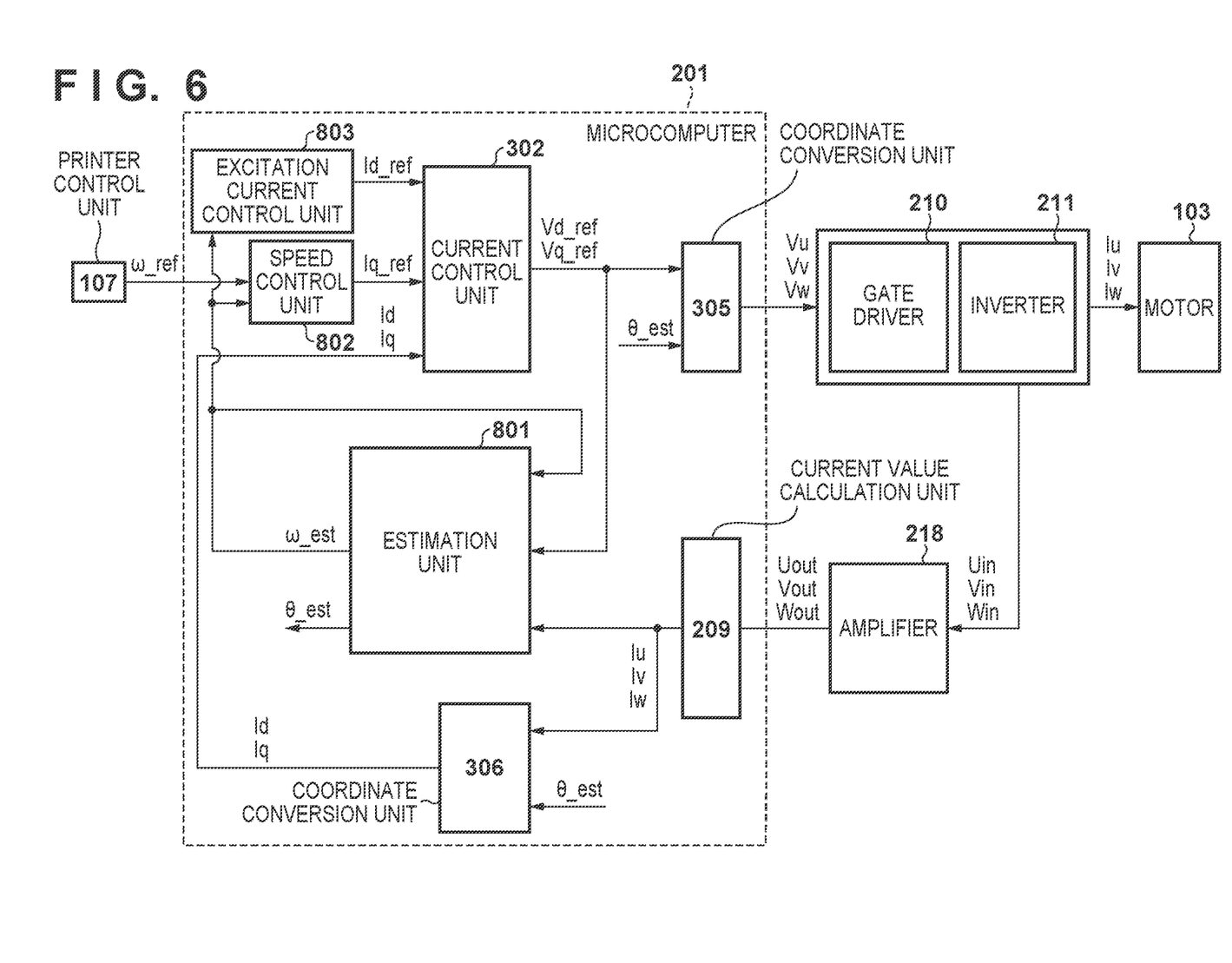
FIG. 6 is a functional block diagram of a microcomputer when performing sensorless control according to an embodiment.

FIG. 6 is a functional block diagram of the microcomputer 201 when performing sensorless control. Note that differences from the functional block diagram in the forced commutation control illustrated in FIG. 5 will mainly be explained below. An estimation unit 801 determines, based on the current values Iu, Iv, and Iw, the voltage command values Vd_ref and Vq_ref, and a rotation speed ω_est estimated, an induced voltage generated in the coil and estimates an electric angle θ_est and a rotation speed ω_est of the rotor 502. The estimated electric angle θ_est is used for coordinate conversion to be performed by the coordinate conversion units 305 and 306. In addition, a speed control unit 802 calculates the command value Iq_ref that causes generation of a torque required to cause the rotation speed ω_est to follow the speed command value ω_ref (target speed), based on the speed command value ω_ref from the printer control unit 107 and the rotation speed ω_est estimated by the estimation unit 801. The excitation current control unit 803 determines the command value Id_ref based on the rotation speed ω_est, and outputs the determined command value Id_ref to the current control unit 302, as will be described below.

Figure 7A:
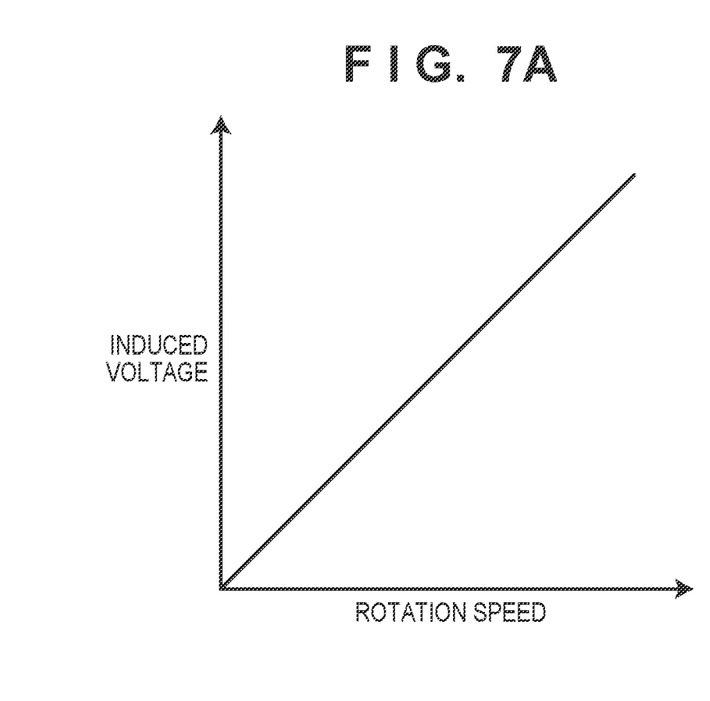
FIG. 7A is a diagram illustrating a relation between rotation speed and induced voltage.
Figure 7B:
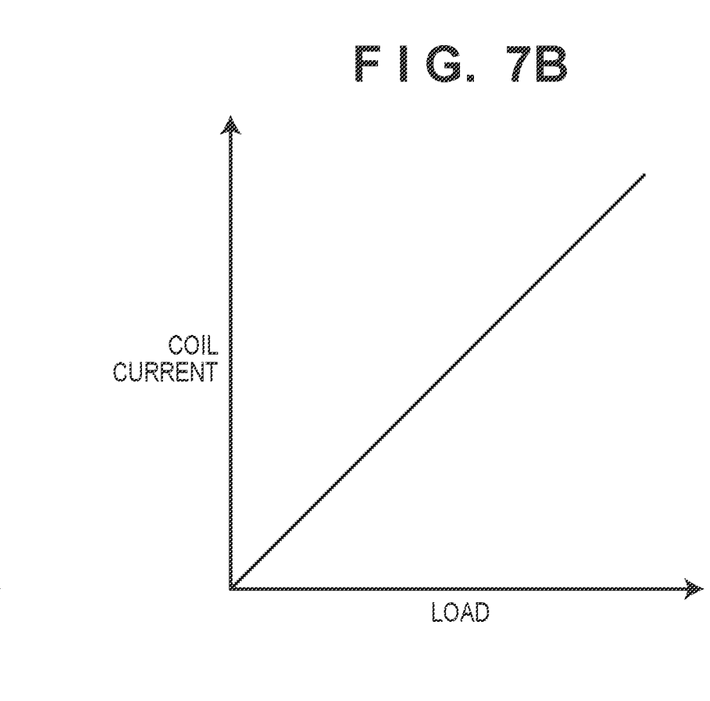
FIG. 7B is a diagram illustrating a relation between load and coil current.

FIG. 7A illustrates a relation between the rotation speed of the rotor 502 and an induced voltage generated in the coil. As illustrated in FIG. 7A, the induced voltage is proportional to the rotation speed of rotor 502, the proportional constant being referred to as an induced voltage constant Ke. FIG. 7B illustrates a relation between the load of the rotor 502 and the coil current. As illustrated in FIG. 7B, the coil current is proportional to the load of the rotor 502, the inverse of the proportional constant being referred to as a torque constant Kt.

Figure 8A:
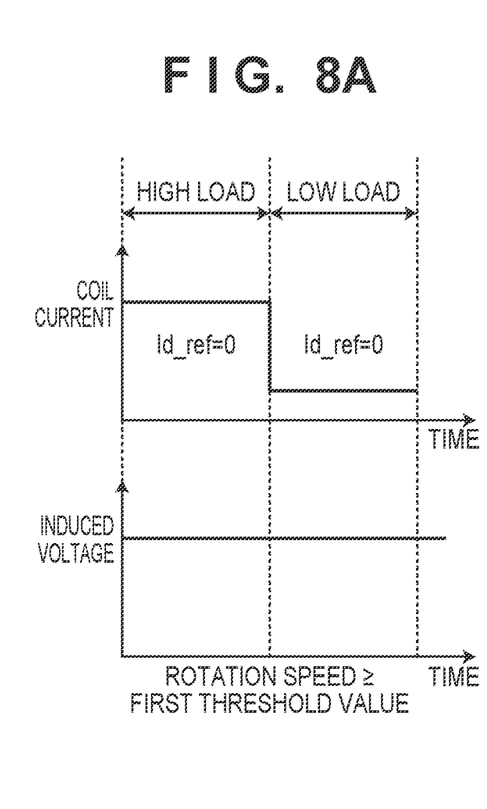
FIGS. 8A to 8C are explanatory diagrams of motor control according to an embodiment.
Figure 8B:
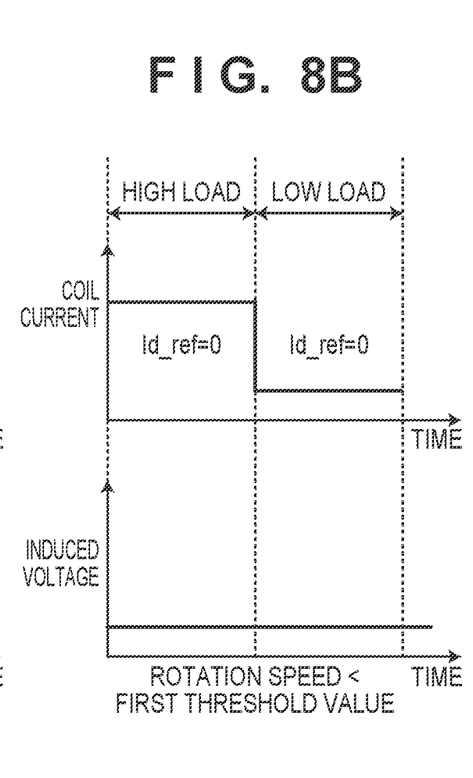
Figure 8C:
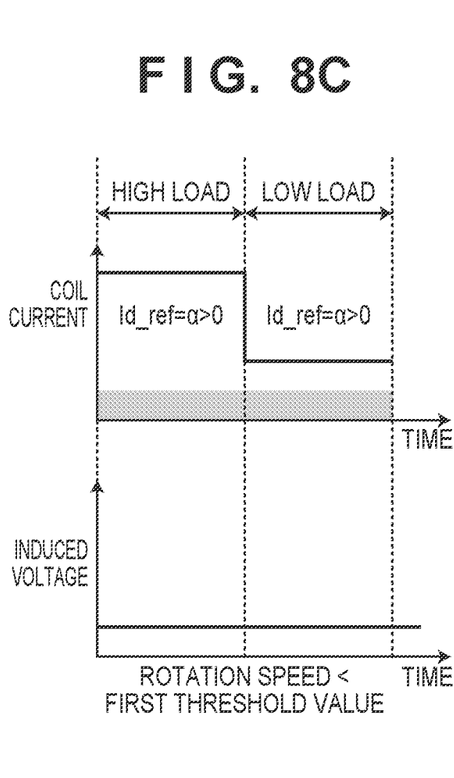

Subsequently, a control method of the coil current according to the present embodiment will be described, referring to FIGS. 8A to 8C. FIG. 8A illustrates a case where the rotation speed of the rotor 502 is constant at or above a first threshold value, and FIGS. 8B and 8C illustrate a case where the rotation speed of the rotor 502 is constant below the first threshold value. Here, each of the drawings illustrates a case where the load of the rotor 502 has changed from a high load to a low load.

First, FIG. 8A will be described. As has been described in FIG. 7A, since the induced voltage generated in the coil is proportional to the rotation speed of the rotor 502, when the rotation speed is constant, the induced voltage is also constant. In addition, the coil current is proportional to the load, as has been described in FIG. 7B. Therefore, when the load of the motor 103 changes from a high load to a low load, the coil current also decreases accordingly. Note that, in FIG. 8A, the command value Id_ref of the excitation current is constantly set to Id_ref=0, i.e., a value that causes the excitation current to be zero. This is for performing a highly efficient motor control by performing a control to cause only the torque current that contributes to the torque to flow, with the excitation current that does not contribute to the torque being set to zero, which is common in vector control.

In vector control, the coil current and induced voltage are used for calculating the electric angle θ_est (corresponding to the rotation phase) and the rotation speed ω_est of the rotor 502. Therefore, when either the coil current or the induced voltage becomes too small, the estimation accuracy of the electric angle θ_est and the rotation speed ω_est may degrade. In particular, simultaneous decrease of both the coil current and the induced voltage makes the estimation accuracy of the electric angle θ_est and the rotation speed ω_est easier to degrade. Here, in FIG. 8A, although a coil current decreases as a load becomes low, the estimation accuracy of the electric angle θ_est and the rotation speed ω_est is good due to a large rotation speed, and therefore a large induced voltage.

On the other hand, in FIG. 8B, the rotation speed of the rotor 502 is below the first threshold value and is lower than that of FIG. 8A, whereby the induced voltage is decreased relative to the case of FIG. 8A. Note that, also in FIG. 8B, the command value Id_ref of the excitation current is set to zero, similarly to that of FIG. 8A. In the case of FIG. 8B, the induced voltage is always small, and therefore as a load of the motor 103 is low, both the coil current and the induced voltage may simultaneously decrease, whereby the estimation accuracy of the electrical angle θ_est and the rotation speed ω_est may degrade. Degradation of the estimation accuracy of the electric angle θ_est and the rotation speed ω_est causes rotation unevenness of the rotor 502, which may result in an unstable rotation control of the rotor 502.

Therefore, when the rotation speed is lower than the first threshold value in the present embodiment, the excitation current control unit 803 sets the command value Id_ref of the excitation current to a value a larger than zero, and controls the exciting current that does not contribute to the torque to be at a value larger than zero. Flowing the excitation current generates a force in the rotor 502 in a direction that does not contribute to rotation of the rotor 502. In order to compensate for the force generated by the excitation current, the torque current is increased relative to when the excitation current is zero. In other words, setting the excitation current to a value larger than zero increases a torque current relative to when the excitation current is zero. The coil current is a vector sum of the excitation current and the torque current, and therefore causing the excitation current to be larger than zero causes the coil current to be larger by the vector sum of the increased amount of the torque current and the amount of the excitation current increased from zero. The shading part in FIG. 8C illustrates an increased amount of the coil current due to causing the excitation current to be larger than zero.

In FIG. 8C, the coil current has increased by the height of the shading part in comparison with FIG. 8B. Therefore, appropriately setting the value a of the command value Id_ref of the excitation current allows for suppressing simultaneous decrease of the coil current and the induced voltage. Accordingly, it is possible to suppress degradation of the estimation accuracy of the electric angle θ_est and the rotation speed ω_est, thereby realizing a stable rotation control of the stable rotor 502.

Figure 9:
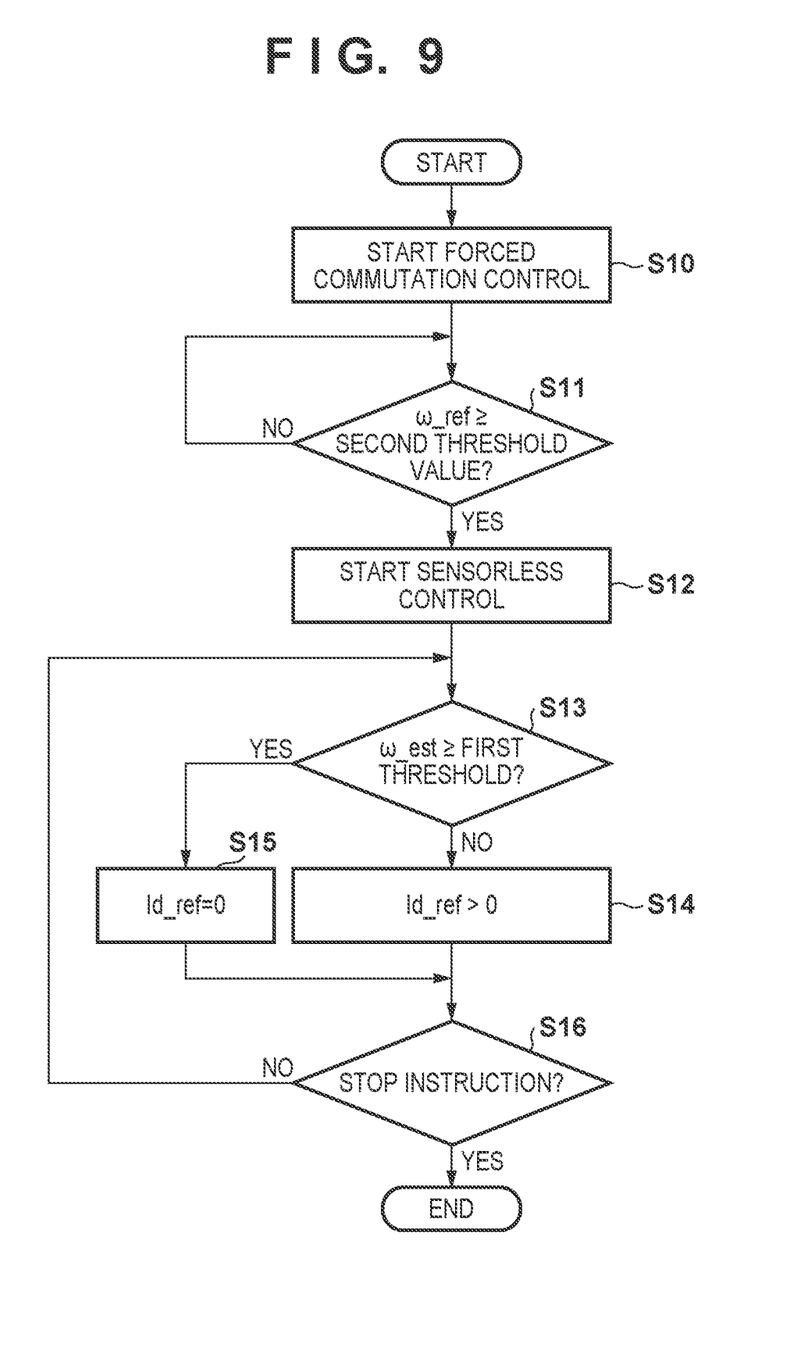
FIG. 9 is a flowchart of motor control according to an embodiment.

FIG. 9 is a flowchart of a motor control process according to the present embodiment. At S10, the motor control unit 110 starts a forced commutation control. During the forced commutation control, the command values Iq_ref and Id_ref are set to a predetermined value. Here, the predetermined value for the command value Iq_ref is a value larger than zero. On the other hand, the predetermined value for the command value Id_ref is a value of equal to or larger than zero, for example, zero. At S11, the motor control unit 110 continues the forced commutation control until the speed command value ω_ref provided from the printer control unit 107 reaches or exceeds a second threshold value, which is a predetermined speed. After the speed command value ω_ref has reached or exceeded the second threshold value, the motor control unit 110 switches from the forced commutation control to the sensorless control, at S12. Here, the second threshold value is lower than the first threshold value.

The motor control unit 110, after the start of sensorless control, determines, when the rotation speed becomes substantially constant, whether the rotation speed ω_est is equal to or larger than the first threshold value, at S13. When the rotation speed ω_est is equal to or larger than the first threshold value, the motor control unit 110 sets the command value Id_ref to zero at S15, which is a value that causes the excitation current to be zero. When, on the other hand, the rotation speed ω_est is lower than the first threshold value, the motor control unit 110 sets the command value Id_ref to the predetermined value α>0 at S14, which is a value that causes the excitation current to flow. The motor control unit 110 determines, at S16, whether or not a stop instruction is received from the printer control unit 107. While the stop instruction is not received, the motor control unit 110 repeats the process from S13. When, on the other hand, a stop instruction is received, the motor control unit 110 stops rotation of the rotor 502 and terminates the process of FIG. 9.

As such, the command value Id_ref of the excitation current is set to a value larger than zero when the rotation speed of the rotor 502 is lower than the first threshold value in the vector control. The aforementioned configuration allows for performing a stable rotation control of the rotor 502 even when the load is lightened in a case where a rotation speed of the rotor 502 is low. Here, it is assumed in the above description that, after the start of vector control, the process at S13 waits until the rotation speed of the rotor 502 becomes substantially constant, and is subsequently performed. It means that the process waits until the rotation speed of the rotor 502 reaches a predetermined target speed. Note that, in a case where the speed command value ω_ref provided from the printer control unit 107 continued unchanged for a predetermined time period, the motor control unit 110 determines that the rotation speed has reached the predetermined target speed. However, it may also be configured to perform the process at S13 without waiting, after the start of vector control at S12, until the rotation speed of the rotor 502 reaches the predetermined target speed. In other words, it may also be configured to dynamically control, upon transitioning to sensorless control, the setting value of the command value Id_ref of the excitation current based on the rotation speed ω_est.

Second Embodiment

Figure 10A:
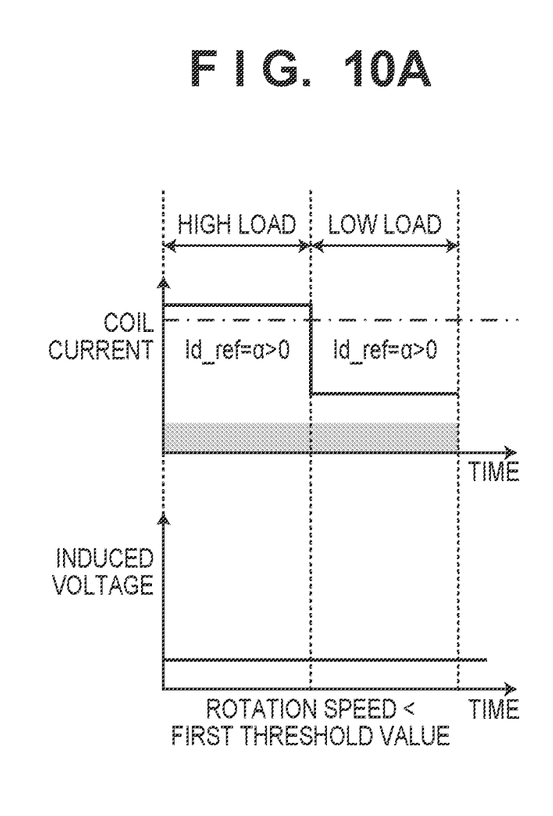
FIGS. 10A and 10B are explanatory diagrams of motor control according to an embodiment.

Next, a second embodiment will be explained mainly on differences from the first embodiment. In the first embodiment, the excitation current control unit 803 is configured to set the command value Id_ref of the excitation current to a value larger than zero when the rotation speed of the motor is lower than the first threshold value. Accordingly, the coil current increases relative to the case of Id_ref=0. However, when a load of the motor 103 is high, a coil current becomes excessively large, whereby the rotation of the rotor 502 may become unstable. FIG. 10A illustrates the same diagram as FIG. 8C. In FIG. 10A, the maximum allowable value of the coil current is indicated by the long dashed short dashed line. In FIG. 10A, the coil current exceeds the maximum allowable value under a high load.

Figure 10B:
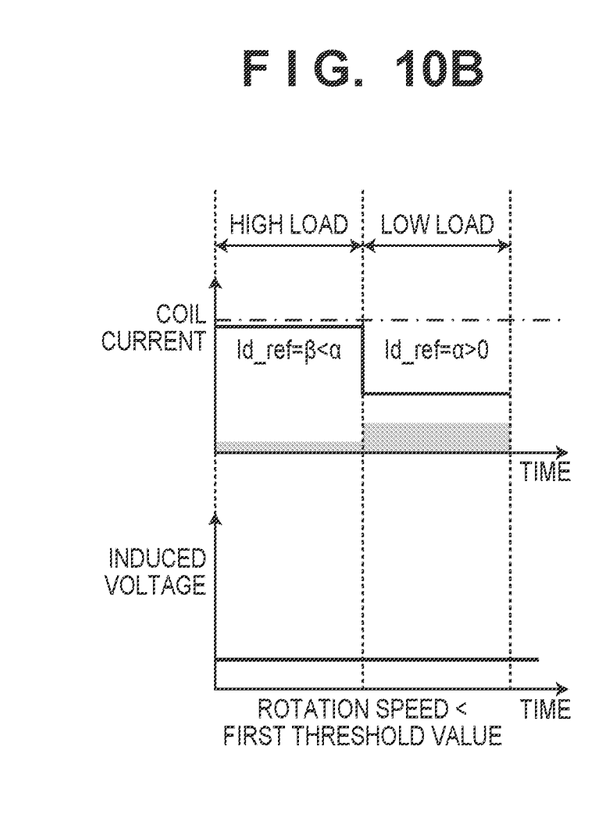

The present embodiment therefore controls the command value Id_ref of the excitation current in accordance with the magnitude of the load. In FIG. 10B, the command value Id_ref of the excitation current is set to α under a low load, and the command value Id_ref of the excitation current is set to β under a high load. Here, α>β≥0 holds. As illustrated in FIG. 10B, when the load is higher, reducing the command value Id_ref of the excitation current allows for suppressing the coil current from exceeding the maximum value and performing stable rotation control of the motor 103. Here, the relation between the magnitude of the load and the command value Id_ref of the excitation current is preliminarily determined and stored in the nonvolatile memory 205 of the motor control unit 110 as control information. Subsequently, information indicating the magnitude of the load is input to the excitation current control unit 803 from an unillustrated load detection unit and, when the rotation speed of the rotor 502 is lower than the first threshold, the excitation current control unit 803 determines the command value Id_ref of the excitation current based on the magnitude of the load and the control information.

Here, the magnitude of the load can be determined from the measurement value Iq of the torque current. Therefore, it may also be configured to preliminarily determine and store, in the nonvolatile memory 205, the relation between the measurement value Iq of the torque current and the command value Id_ref of the excitation current, instead of the relation between the magnitude of the load and the command value Id_ref of the excitation current. In this case, the measurement value Iq of the torque current is input to the excitation current control unit 803. Here, determining the magnitude of the load is not limited to determining based on the measurement value Iq of the torque current. For example, it may also be configured to preliminarily measure what size of load is used at what timing in a predetermined sequence for image formation and store, in the nonvolatile memory 205, the control information indicating the relation between the timing and the size of load in the predetermined sequence. In this case, information indicating timing in a predetermined sequence, for example, is input from the printer control unit 107 to the excitation current control unit 803.

Figure 11:
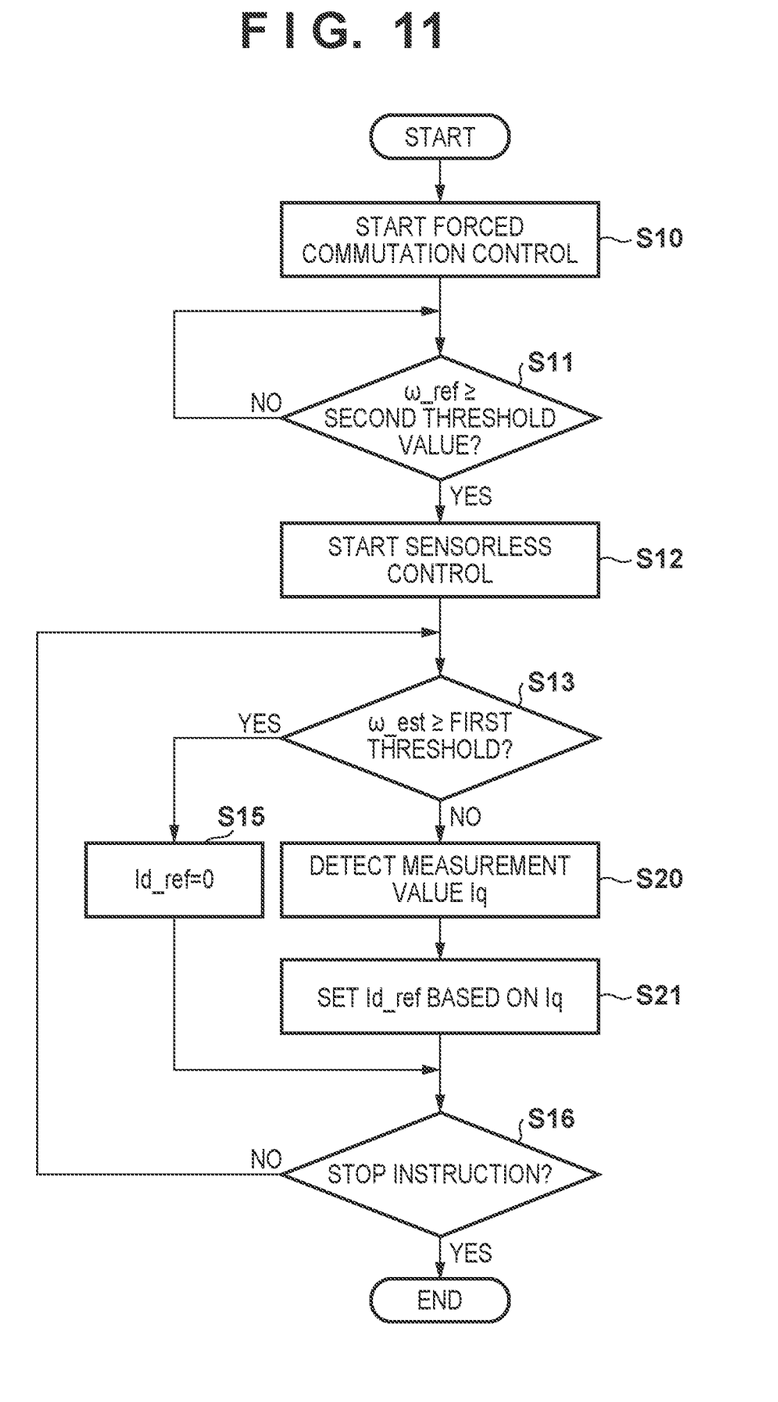
FIG. 11 is a flowchart of motor control according to an embodiment.

FIG. 11 is a flowchart of the motor control process according to the present embodiment. Here, the process steps similar to those in the flowchart of FIG. 8 are provided with same step numbers and description thereof is omitted. In the flowchart of FIG. 11, S14 in the flowchart of FIG. 8 is replaced by S20 and S21. When the rotation speed ω_est is smaller than the first threshold, the motor control unit 110 determines, at S20, the magnitude of the load of the motor. The present example uses the measurement value Iq of the torque current as the evaluation value indicating the magnitude of the load. At S21, the motor control unit 110 sets the command value Id_ref of the excitation current based on the magnitude of the load.

As such, setting the command value Id_ref of the excitation current by considering both the rotation speed and the load of the rotor 502 allows for performing stable rotation control of the rotor 502 for any rotation speed and any load of the rotor 502.

Note that the present embodiment has set the command value Id_ref of the excitation current is set to zero regardless of the magnitude of the load when the rotation speed of the rotor 502 is equal to or larger than the first threshold value. However, instead of providing the first threshold value, it may also be configured to control the value to be set to the command value Id_ref, based on both the rotation speed and the magnitude of the load of the rotor 502. In this case, the volatile memory 205 stores control information indicating the relation between the combination of the rotation speed and the load (or the evaluation value of the load) and the command value Id_ref of the excitation current. Note that, also in this case, the higher the rotation speed of the rotor 502, the more the command value Id_ref of the excitation current is reduced, and the larger the load, the more the command value Id_ref of the excitation current is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-117319, filed Jul. 15, 2021, which is hereby incorporated by reference herein in its.

What is claimed is:

1. A motor control apparatus comprising:
a current supply unit configured to supply a coil current to a plurality of coils of a motor by controlling a plurality of phase voltages to be applied to the plurality of coils, based on a first command value of an excitation current and a second command value of a torque current; and
a control unit configured to control the first command value of the excitation current based on a rotation speed of a rotor of the motor and the second command value of the torque current based on a load of the motor, wherein the load is a member driven by the motor and, wherein the control unit is further configured to:
in a case where the rotation speed of the rotor is not lower than a first threshold value, control the first command value to cause the excitation current to be zero and control the second command value to supply the torque current in accordance with the load; and
in a case where the rotation speed of the rotor is lower than the first threshold value, control the first command value to cause the excitation current to be larger than zero and control the second command value to supply the torque current in accordance with the load, wherein the torque current for a same load is increased in the case where the excitation current is larger than zero relative to the case where the excitation current is zero to maintain a stable coil current.

2. The motor control apparatus according to claim 1, wherein the control unit is further configured to control, in the case where the rotation speed of the rotor is lower than the first threshold value, the first command value based on a magnitude of the load of the rotor.

3. The motor control apparatus according to claim 2, wherein the control unit is further configured to cause, in the case where the rotation speed of the rotor is lower than the first threshold value, the first command value to be smaller as the load of the rotor becomes larger.

4. The motor control apparatus according to claim 3, wherein the control unit is further configured to cause, in the case where the rotation speed of the rotor is lower than the first threshold value, the first command value to be smaller as the rotation speed of the rotor becomes higher.

5. The motor control apparatus according to claim 1, wherein the control unit is further configured to determine a magnitude of the load based on a measurement value of the torque current.

6. The motor control apparatus according to claim 1, wherein the control unit is further configured to determine a magnitude of the load based on a timing in a predetermined sequence.

7. The motor control apparatus according to claim 1, wherein the control unit is further configured to set the first command value to a predetermined value when the rotation speed of the rotor is lower than a second threshold, and the second threshold value is smaller than the first threshold value.

8. An image forming apparatus comprising:
a rotating member configured to convey a sheet along a conveyance path;

an image forming unit configured to form an image on the sheet conveyed along the conveyance path;

a motor configured to drive the rotating member or the image forming unit; and a motor control unit configured to control the motor, wherein the motor control unit includes:

a current supply unit configured to supply a coil current to a plurality of coils of the motor by controlling a plurality of phase voltages to be applied to the plurality of coils, based on a first command value of an excitation current and a second command value of a torque current; and a control unit configured to control the first command value of the excitation current based on a rotation speed of a rotor of the motor and the second command value of the torque current based on a load of the motor, wherein the load includes at least one of the rotating member and the image forming unit, and wherein the control unit is further configured to:

in a case where the rotation speed of the rotor is not lower than a first threshold value, control the first command value to cause the excitation current to be zero and control the second command value to supply the torque current in accordance with the load; and in a case where the rotation speed of the rotor is lower than the first threshold value, control the first command value to cause the excitation current to be larger than zero and control the second command value to supply the torque current in accordance with the load, wherein the torque current for a same load is increased in the case where the excitation current is larger than zero relative to the case where the excitation current is zero to maintain a stable coil current.

\* \* \* \* \*